United States Patent
Pound et al.

(10) Patent No.: US 11,461,201 B2
(45) Date of Patent: Oct. 4, 2022

(54) CLOUD ARCHITECTURE FOR REPLICATED DATA SERVICES

(71) Applicant: SAP SE, Walldorf (DE)

(72) Inventors: Jeffrey Pound, Waterloo (CA); Hemant Saxena, Waterloo (CA)

(73) Assignee: SAP SE, Walldorf (DE)

( * ) Notice: Subject to any disclaimer, the term of this patent is extended or adjusted under 35 U.S.C. 154(b) by 25 days.

(21) Appl. No.: 17/128,526

(22) Filed: Dec. 21, 2020

(65) Prior Publication Data

US 2022/0197761 A1 Jun. 23, 2022

(51) Int. Cl.
*G06F 16/00* (2019.01)
*G06F 11/20* (2006.01)
*G06F 11/07* (2006.01)
*G06F 11/14* (2006.01)
*G06F 16/27* (2019.01)

(52) U.S. Cl.
CPC ........ *G06F 11/203* (2013.01); *G06F 11/0709* (2013.01); *G06F 11/1464* (2013.01); *G06F 16/27* (2019.01)

(58) Field of Classification Search
CPC ..................................................... G06F 16/27
See application file for complete search history.

(56) References Cited

U.S. PATENT DOCUMENTS

| | | | | |
|---|---|---|---|---|
| 7,797,582 | B1* | 9/2010 | Stager | G06F 11/2074 |
| | | | | 714/13 |
| 8,762,642 | B2 | 6/2014 | Bates et al. | |
| 8,856,193 | B2 | 10/2014 | Mueller | |
| 9,720,619 | B1* | 8/2017 | Shah | G06F 12/0811 |
| 10,067,909 | B2 | 9/2018 | Kernert et al. | |
| 2011/0251997 | A1* | 10/2011 | Wang | G06F 11/2048 |
| | | | | 707/634 |
| 2013/0110779 | A1* | 5/2013 | Taylor | G06F 16/1844 |
| | | | | 707/624 |
| 2016/0259802 | A1* | 9/2016 | Sedayao | G06F 16/184 |
| 2017/0132086 | A1* | 5/2017 | Blackburn | G06F 11/1466 |
| 2017/0357667 | A1* | 12/2017 | Auch | G06F 16/1865 |

OTHER PUBLICATIONS

Kreps et al., "Kafka: a Distributed Messaging System for Log Processing," Proceedings of the NetDB, 2011, retrieved from: http://notes.stephenholiday.com/Kafka.pdf.
(Continued)

*Primary Examiner* — Khanh B Pham
(74) *Attorney, Agent, or Firm* — Buckley, Maschoff & Talwalkar LLC

(57) ABSTRACT

Systems and methods include a set of delta copies received from cluster node replicas of a replica set and stored on a main data storage on the cloud. A cloud storage service internally replicates the data from the delta copies and provides fault-tolerance and high availability against storage failures. All cluster node replicas participate in a delta copies merge. Each replica writes their deltas to an independent location in a shared storage on the cloud. Then, the delta merge includes deltas from all replicas when building a new main storage. This ensures that the data from all replicas are included in the delta merge.

17 Claims, 13 Drawing Sheets

(56) References Cited

OTHER PUBLICATIONS

Krueger et al., "Fast Updates on Read-Optimized Databases Using Multi-Core CPUs," Proc. VLDB Endow., 5(1):61-72, Sep. 2011, retrieved from; https://citeseerx.ist.psu.edu/viewdoc/download?doi=10.1.1.227.4085&rep=rep1&type=pdf.

Lakshman et al., "A Decentralized Structured Storage System," SIGOPS Oper. Syst. Rev., 44(2):35-40, Apr. 2010, retrieved from: https://www.cs.cornell.edu/projects/ladis2009/papers/lakshman-ladis2009.pdf.

Amazon Webs Services, "Fault-Tolerant Components on AWS," 2019 Amazon Web Services White Paper, Nov. 2019, 23 pages total. Retrieved from: https://docs.aws.amazon.com/whitepapers/latest/fault-tolerant-components/fault-tolerant-components.pdf.

"Bartok et al., 'Proceedings of the Third HPI Cloud Symposium "Operating the Cloud" 2015,' Technische Berichte Nr. 105, Technische Berichte des Hasso-Plattner-Instituts fürSoftwaresystemtechnik an der Universitat Potsdam, Universitätsverlag Potsdam 2016, Retrieved from: https://publishup.uni-potsdam.de/opus4-ubp/frontdoor/deliver/index/docId/8754/file/tbhpi105.pdf".

Microsoft, "Offload Read-Only Workload to Secondary Replica of an Always on Availability Group," Microsoft web page article dated Jun. 6, 2016, retrieved from: https://docs.microsoft.com/en-us/sql/database-engine/availability-jroups/windows/active-secondaries-readable-secondary-replicas-always-on-availability-groups?view=sql-server-ver15.

\* cited by examiner

CLOUD ARCHITECTURE FOR REPLICATED DATA SERVICES

BACKGROUND

Many services replicate data for fault-tolerant storage of the data and high availability of the service. Fault tolerance refers to the ability of a computer system or storage system to suffer failures in a component hardware or software parts yet continue to function without a service interruption and without losing data or compromising safety. High availability is a functionality of a system or component that assures a high level of operational performance for a given period. One of the goals of high availability is to eliminate single points of failure in a system.

When deployed in the cloud, the replication performed by these services provides the desired high availability but does not provide significant additional fault-tolerance for the data. This is because cloud deployments use fault-tolerant storage services instead of the simple local disks that many replicated data services were designed to use. Because the cloud storage services already provide fault-tolerance for the data, the extra replicas create unnecessary cost in running the service. However, replication is still needed for high availability of the service itself.

Infrastructure-as-a-Service providers (i.e., cloud providers) have become the standard for deploying services of all kinds. However, migrating services engineered for on-premise servers to the cloud can be challenging, specifically when leveraging the highly available cloud storage. When these services get deployed on the cloud, they often end up using cloud storage similar to local on-premise storage, and this mismatch introduces inefficiencies in the system.

BRIEF DESCRIPTION OF THE DRAWINGS

The accompanying drawings are incorporated herein and form a part of the specification.

DETAILED DESCRIPTION

The following description is provided to enable any person in the art to make and use the described embodiments. Various modifications, however, will remain readily-apparent to those in the art.

Replicated data services manage database state and use replication for fault tolerance and high availability. These services include a variety of back-end services used to build various applications including, but not limited to, replicated relational databases (e.g., PostgreSQL®), scalable key-value stores (e.g., Apache Cassandra®), and ingest pipelines (e.g., Apache Kafka®). Many of these services were originally engineered for on-premise deployments and share a common property of their monolithic architecture: they all manage their own copy of some shared state. It is possible to deploy an existing replicated service to the cloud without changes to the service itself. Storage services can be exposed as block devices or network attached file systems, giving the abstraction of the local disk our services were designed to manage. However, this can lead to redundant replication of storage and decreased system performance.

Replicated data services provide application-level replication of data for high read throughput, fault-tolerance, and high availability. On the other hand, cloud storage provides storage-level replication of the data for the same reasons. When replicated services are deployed on the cloud the data replication quadruples due to the two independent levels of replication that become the part of the whole system. This is known as redundant replication. Generally, an application is using cloud storage, with application-level and storage-level replication factors of 3, and the data (e.g., key value (a; 1)) is stored nine times.

Figure 1:
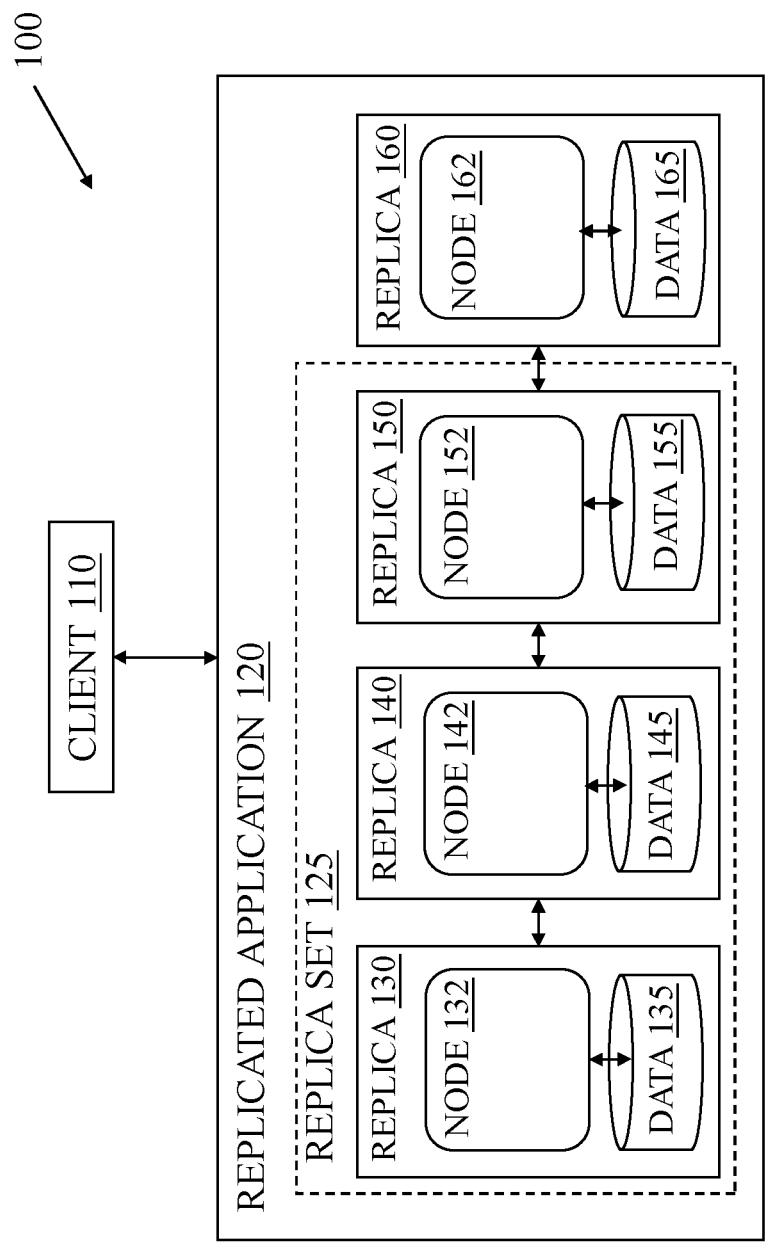
FIG. 1 illustrates system 100 that represents an exemplary replicated application on premise.

FIG. 1 illustrates system 100 that represents an exemplary replicated application on premise. System 100 includes client 110 that communicates with replicated application 120. Replicated application 120 represents a replicated data service that provides application-level replication of data. Replicated application 120 includes several replicas of the data, e.g., replica 130, replica 140, replica 150, and replica 160. These replicas include the nodes (i.e., machines) of a cluster system, e.g., node 132, node 142, node 152, and node 162. Further, the replicas include replicated data from the corresponding databases of the nodes, e.g., data 135, data 145, data 155, and data 165. A subset of these replicas forms a replica set 125. For example, replica 130, replica 140, replica 150. Inside replicated application 120, there may be multiple replica sets. Each replica set may have multiple nodes.

Figure 2:
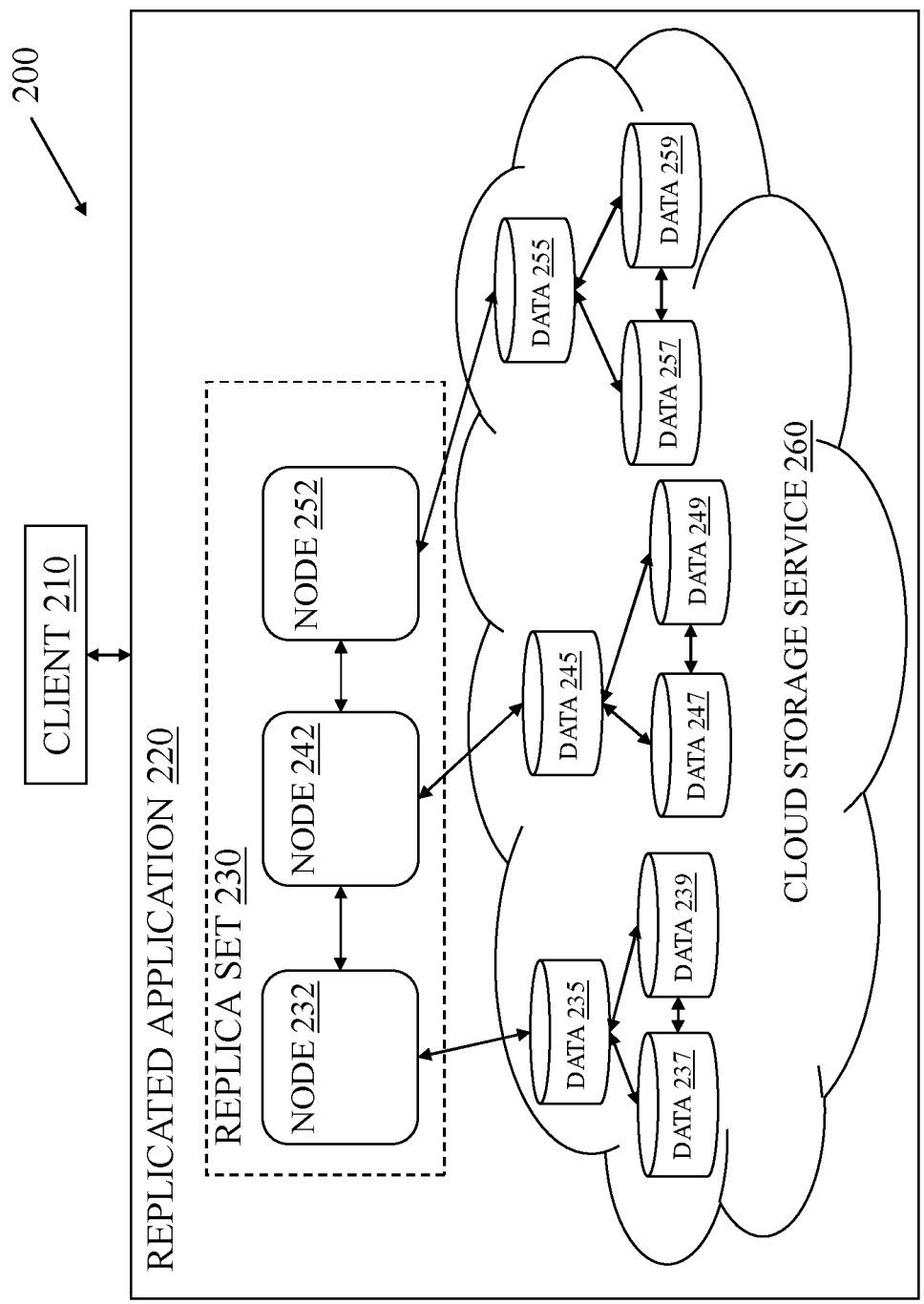
FIG. 2 illustrates system 200 that represents an exemplary replicated application on the cloud.

FIG. 2 illustrates system 200 that represents an exemplary replicated application on the cloud. System 200 includes client 210 that communicates with replicated application 220. Replicated application 220 is on the cloud. When applications are moved from on-premise solutions to the cloud, these applications rely on cloud storage service 260 provided by the given cloud provider for data replication.

Replicated application 220 represents a replicated data service that provides application-level replication of data. Replicated application 220 includes several replica sets, such as replica set 230. Replica set 230 includes replicas of cluster nodes 232, 242, and 252. Inside replicated application 220, there may be multiple replica sets. Each replica set may have multiple nodes, including but not limited to, node 232, 242, and node 252. The data of the cluster nodes 232, 242 and 252 is stored on the cloud by cloud storage service 260.

Cloud storage service 260 provides fault-tolerance and high-availability using its own internal data replication. Replicated application 220 also replicates data to provide the same properties. This leads to additional application-level replication provided by the replicated application 220 over what the cloud storage service 260 already provides. For example, multiple copies of a service are running within a single availability zone (AZ) to tolerate host failure or network partitions. If the storage service 260 is available to all hosts within the AZ, then storing multiple copies of data (e.g., data 235, 245, and 255) within that storage service 260 does not increase data availability. Furthermore, storage service 260 already guarantees durability of stored data under various types of failure scenarios.

In some cases, the application-level replication is still needed. For example, if a storage service is not available across multiple availability zones (AZ) within a geographic region, then application-level replication is required to preserve data availability under AZ failure. However, if a storage service is available in all availability zones, then storing multiple copies of data within that storage service again becomes redundant.

Referring back to FIG. 2, the data of the cluster nodes 232, 242 and 252 is stored on the cloud. Each cluster node is connected to cloud storage service 260. The data of each node is replicated three times in the cloud. For example, the data of cluster node 232 is stored to data store 235, data store 237, and data store 239. The data of cluster node 242 is stored to data store 245, data store 247, and data store 249. The data of cluster node 252 is stored to data store 255, data store 257, and data store 259. Since the data of the replicas in replica set 230 is the same among nodes 232, 242, and 252, then any copy of data from the replica set 230 is stored nine times in the cloud storage. This leads to higher costs for managing the data on the cloud than on premise.

Generally, cloud provided storage services (e.g., storage service 260) have different performance characteristics compared to each other and the on-premise physical disks. For example, storage I/O latency for on-premise deployment (using local disk) is lower than the I/O latency when using cloud storage. Data centric services, like RDBMSs and scalable key-value stores, optimize I/O performance on local disks. Furthermore, different storage services have different availability properties. Some are only available to a single host at a time, some can be shared among hosts within a single availability zone or data center (e.g., Google Cloud Filestore®), and others can be shared among hosts across availability zones in a geographic region.

If the application-level replication is removed, since the storage service 260 already provides fault-tolerance via replication, there is no need for the application 220 to replicate for fault-tolerance. However, this will result in the loss of availability of the service. If the single running instance is unreachable, e.g., due to process crash, machine failure, or network partition, then the entire service becomes unavailable.

An alternative is to have multiple copies of the service share a single primary copy of the data on the cloud storage service. Thus, availability is maintained by having multiple instances of the services running without actually using application-level replication. However, in this way all writes to the system need to be persisted to the cloud storage service to ensure no data is lost if a service fails. For systems that buffer writes in memory and flush them to storage in batches this introduces significant latency. Also, services that are engineered as shared-nothing architectures and that have multi-writer designs would require concurrent writes to shared data. This would require re-engineering the storage of the system to coordinate concurrent updates to the shared storage and introduces contention in the system.

Figure 3:
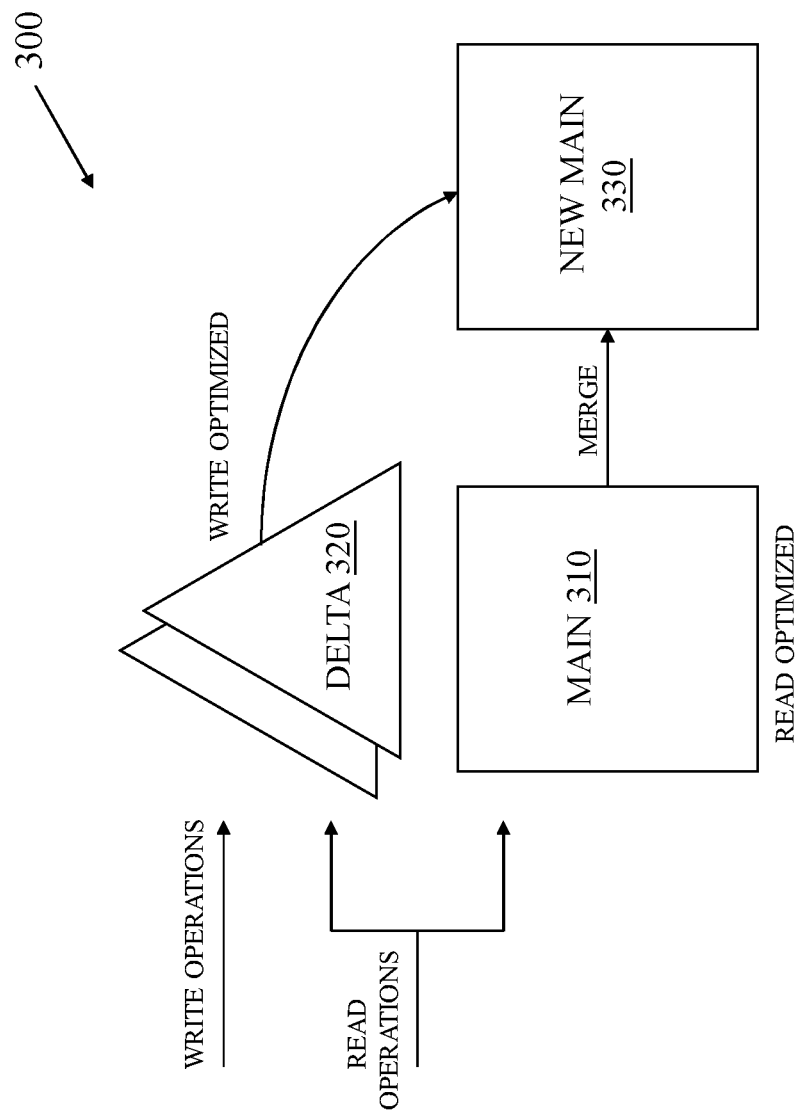
FIG. 3 illustrates system 300 that represents an exemplary main-delta architecture.

FIG. 3 illustrates system 300 that represents an exemplary main-delta architecture. In various embodiments, a main-delta architecture 300 is used to leverage cloud storage efficiently. Main-delta architecture 300 has a large read-only main data segment 310. Main data 310 is periodically rebuilt to incorporate a number of deltas 320 in a process called "delta merge". Delta 320 is a small temporary space that stores data. When new data is generated, it is directly stored in delta 320. Deltas 320 are relatively small. For example, a single delta can be 1 percent of the size of main data 310. Therefore, delta 320 can be filled up regularly at some intervals. When delta 320 is full of new data, a merge operation is executed that merges the data in delta 320 with main data 310 into a new main data 330. Usually, the number of deltas is at least two. So, when one delta 320 is merging with the main data 310, there is at least one more delta to perform the write operations to the data.

Figure 4:
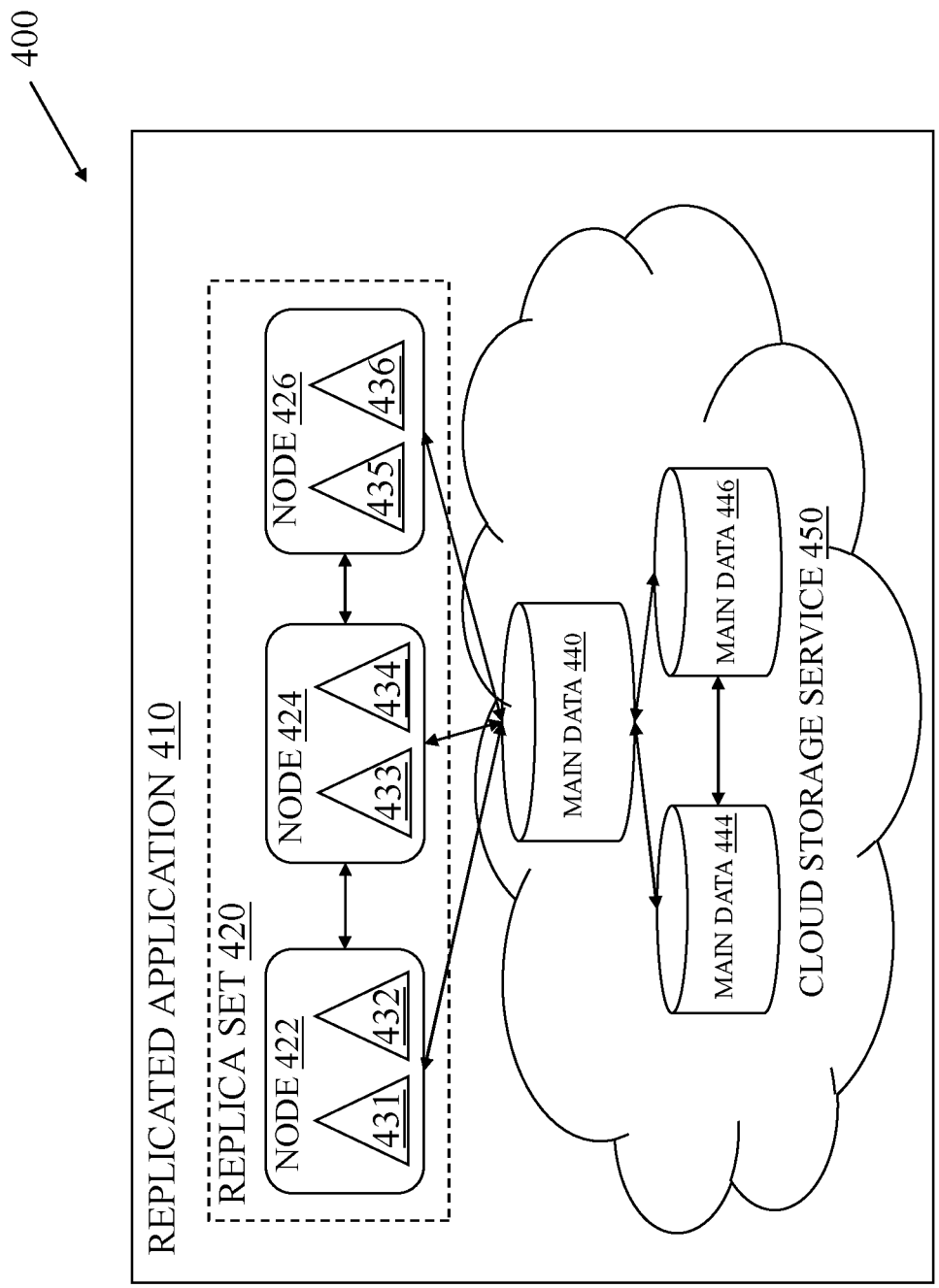
FIG. 4 illustrates system 400 that represents how a main-delta architecture is adopted by replicated services on the cloud, according to some embodiments.

FIG. 4 illustrates system 400 that represents how a main-delta architecture is adopted by replicated services on the cloud, according to some embodiments. Main-delta architecture 400 includes replicated application 410. Replicated application 410 represents replicated application 220 enhanced with the main-delta concept of system 300. Replicated application 410 includes a replica set 420 including replicas of cluster nodes. For example, node 422, node 424, and node 426. In some embodiments, replica set 420 may include more than three replicas.

Each cluster node, such as node 422, node 424, and node 426, includes at least two deltas. Cluster node 422 includes delta 431 and delta 432, cluster node 424 includes delta 433 and delta 434, cluster node 426 includes delta 435 and delta 436. Deltas are managed by the corresponding cluster nodes. Each replica node (422, 424, and 426) can maintain its delta using the application-level replication. In some embodiments, the deltas are kept on a local disk. In other embodiments, the deltas are stored in a private area of the cloud storage service 450. And in some embodiments, the deltas are stored in-memory depending on the environment and durability guarantees of the system.

The main data 440 is stored on the cloud. The main data 440 is managed by the cloud storage service 450. Cloud storage service 450 provides guarantees for fault tolerance and high availability. Hence, main data 440 is provided with fault tolerance and high availability. This means that main data 440 is internally replicated within the cloud and the data is copied to a second main data storage unit 444 and a third main data storage unit 446. The data in main 440, second main 444, and third main 446 is the same and is managed by the cloud storage service 450.

Main data 440 stores most of the data and the deltas just a small portion of the data. For example, 99% of the data is stored in main data 440 and 1% of the data is stored in deltas 431 and 432. In this example, the cloud storage service 450 guarantees for high availability and fault tolerance for the 99% of the data. The replica sets (e.g., replica set 420) are responsible to provide the high availability and fault tolerance for the remaining 1% of the data, which is stored in the deltas.

Figure 5A:
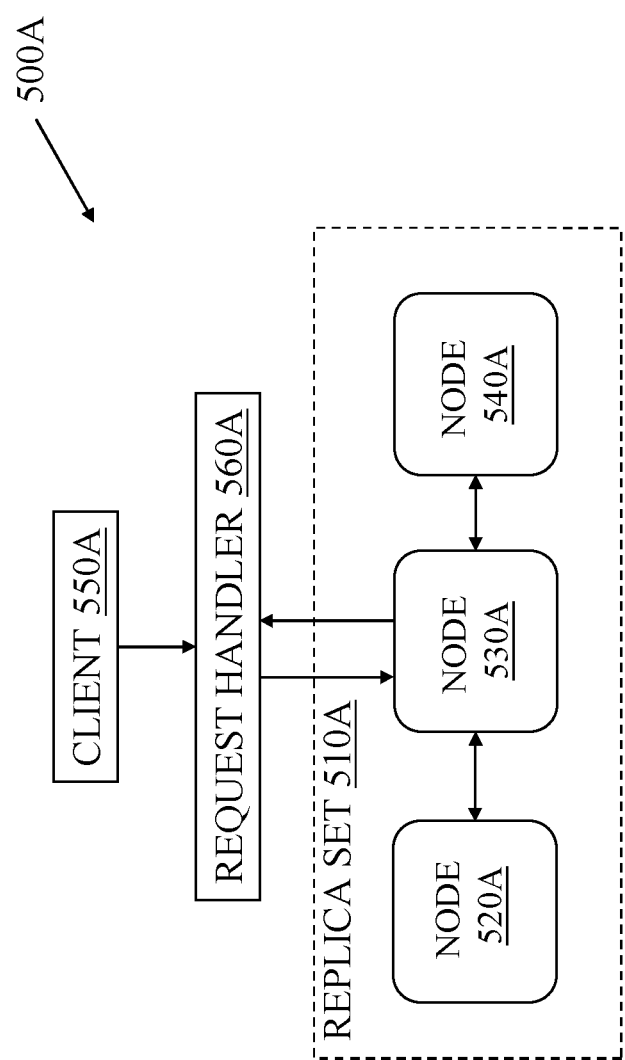
FIG. 5A illustrates system 500A that represents a single-writer/single-reader application-level replication strategy.
Figure 5B:
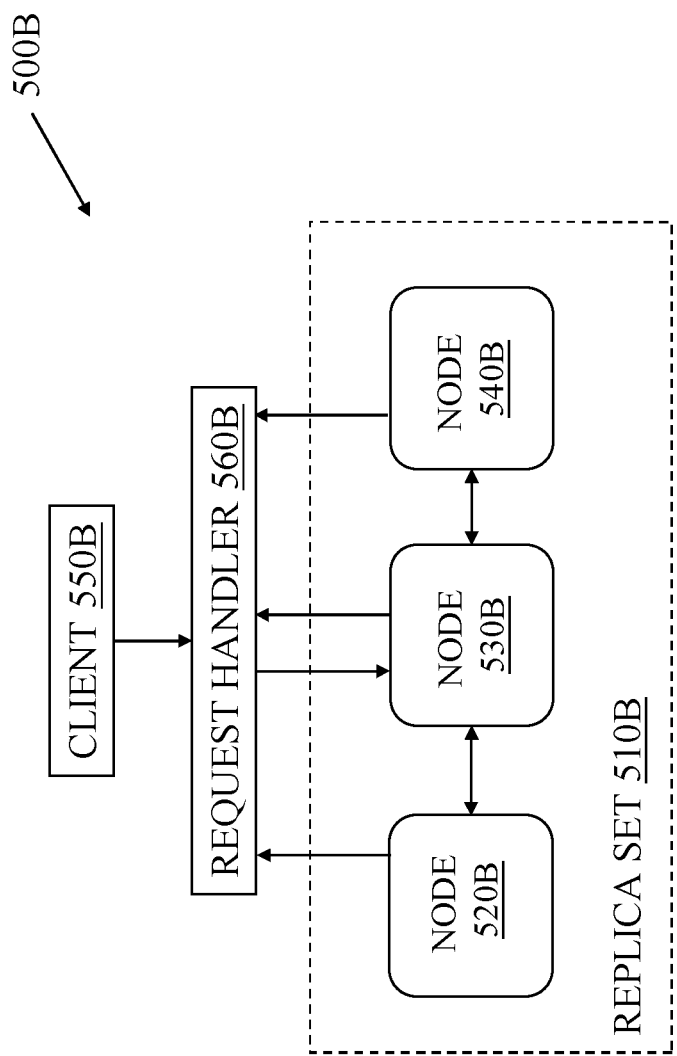
FIG. 5B illustrates system 500B that represents a single-writer/multi-reader application-level replication strategy.
Figure 5C:
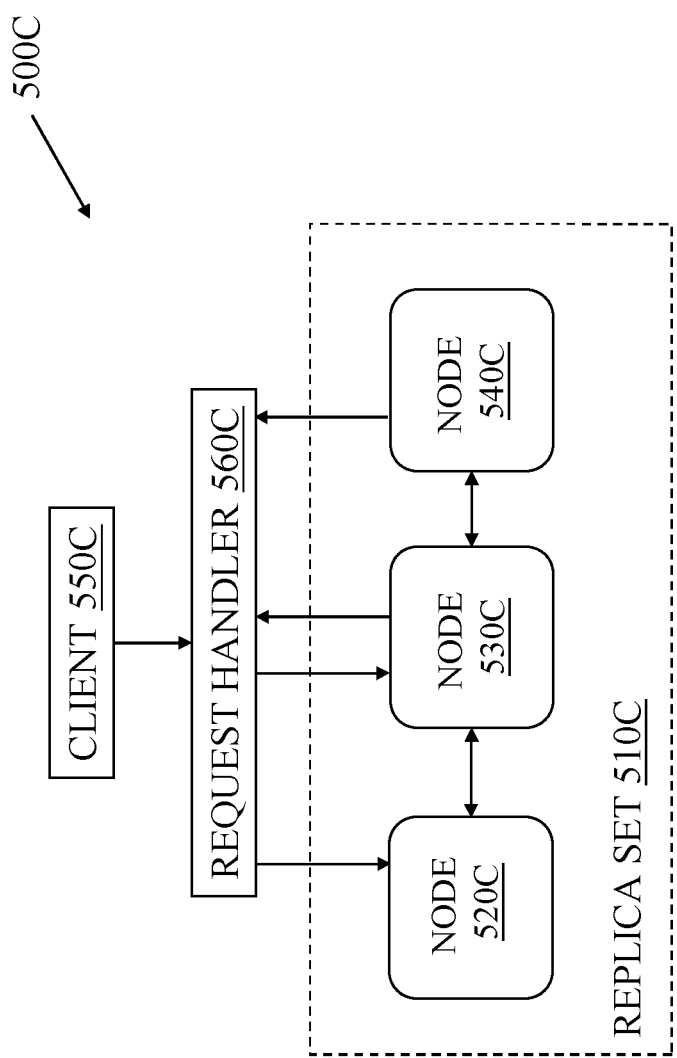
FIG. 5C illustrates system 500C that represents a multi-writer/multi-reader application-level replication strategy.

FIG. 5A-FIG. 5C illustrate systems for application-level replication strategies.

FIG. 5A illustrates system 500A that represents a single-writer/single-reader application-level replication strategy. System 500A includes replica set 510A that includes cluster nodes 520A, 530A, and 540A. Node 530A is defined as a primary node or a master node. Nodes 520A and 540A are defined as secondary nodes. Primary node 530A is responsible for handling the read and write operations to the data and has the latest state of the data. The read operations are used to read data from the replica nodes. The write operations are used to insert new data in the replica nodes. The read and write data operations are requested by client 550A via request handler 560A. The data from primary node 530A is replicated to nodes 520A and 540A. As soon as a new write request is received from client 550A, almost immediately (for example, within a few milliseconds) node 530A receives the new data from the write request. Then, with a short or no delay, the new data is copied to 520A and 540A. In some scenarios, the delay period, in which nodes 520A and 540A receive the data is configurable. For example, in some scenarios the data can be received immediately and in other scenarios, with a delay of a few seconds.

FIG. 5B illustrates system 500B that represents a single-writer/multi-reader application-level replication strategy. System 500B includes replica set 510B that includes cluster nodes 520B, 530B, and 540B. Node 530B is defined as a primary node or a master node. Nodes 520B and 540B are defined as secondary nodes. Primary node 530B is responsible for handling read and write operations to the data and has the latest state of the data. The secondary nodes 520B and 540B are also responsible to handle read operations to the data. The read and write data operations are requested by client 550B via request handler 560B. The data from primary node 530B is replicated to nodes 520B and 540B.

As soon as a new write request is received from client 550B, almost immediately (for example, within a few milliseconds) node 530B receives the new data from the write request. Then, with a short delay (for example, between a few milliseconds and a few seconds), the new data is copied to 520B and 540B. If a read operation request is received, then any of the nodes 520B, 530B, or 540B can handle the request. The role of the replica nodes is to provide fault-tolerance, high-availability, and read scale-out.

FIG. 5C illustrates system 500C that represents a multi-writer/multi-reader replication strategy. System 500C includes replica set 510C that includes cluster nodes 520C, 530C, and 540C. Any of the nodes, 520C, 530C, or 540C can handle read and write operations. The read and write data operations are requested by client 550C via request handler 560C. This is performed by majority voting or a quorum system. This means that a majority of the nodes is necessary to send data back when a read operation is performed or to insert the new data, when a write operation is performed. For example, if the quorum system is configured to have two nodes (out of the three nodes) respond, then a write operation needs to be performed, as soon as any two of the three nodes 520C, 530C, and 540C commit that they have inserted the new data, then the write operation is considered as performed and successful.

Similarly, if a read operation needs to be performed, as soon as any two of the three nodes 520C, 530C, and 540C return the requested data back to client 550C, then the read operation is considered as performed and successful.

The role of the replicas in system 500C is to provide fault-tolerance, high-availability, and read and write scale-out. In some multi-writer/multi-reader systems, quorums of nodes are used to accept writes, which means that not all replicas in a replica-set are exact replicas of each other.

Depending on the replication strategy, the delta-merge strategy can be as simple as a master node always merging the deltas or a more complex one involving deltas of all replica nodes. In addition to the delta-merge strategy, the different replication strategies also determine which type of cloud storage can be used when using main-delta architecture for replicated services.

Cloud storage can be classified into the following three categories: network attached block devices, network files system (NFS) shared storage, and Object Stores. The network attached block devices storage is similar to an on-premise disk. The storage is bound or attached to a single compute instance. The NFS shared storage is shared across multiple compute instances. Any number of compute instances can mount the storage, hence allowing multiple instances to simultaneously read and write the data. The Object Stores allow reading and writing named objects. This storage does not allow for in-place updates, data can be deleted and inserted again with new values.

For single-writer/single-reader replication (e.g., system 500A), the delta can be merged only by the master node and the reads are also served by the master node. Therefore, any cloud storage which allows for one or more compute nodes to read and write data is suitable. That is, all the above types of storage can be used. For the single-writer/multi-reader replication (e.g., system 500B) the delta is merged only by the master node, but the reads are served by all the replica nodes. Therefore, each node has read access to the main. Hence, only NFS shared storage and Object Stores can be used to store the main. Similarly, for multi-writer/multi-reader replication (e.g., system 500C), the delta from all the nodes needs to be merged, and each node serves the reads. Therefore, all nodes need read and write access to the storage. Hence, only NFS shared storage and Object Stores can be used to store the main.

Figure 6:
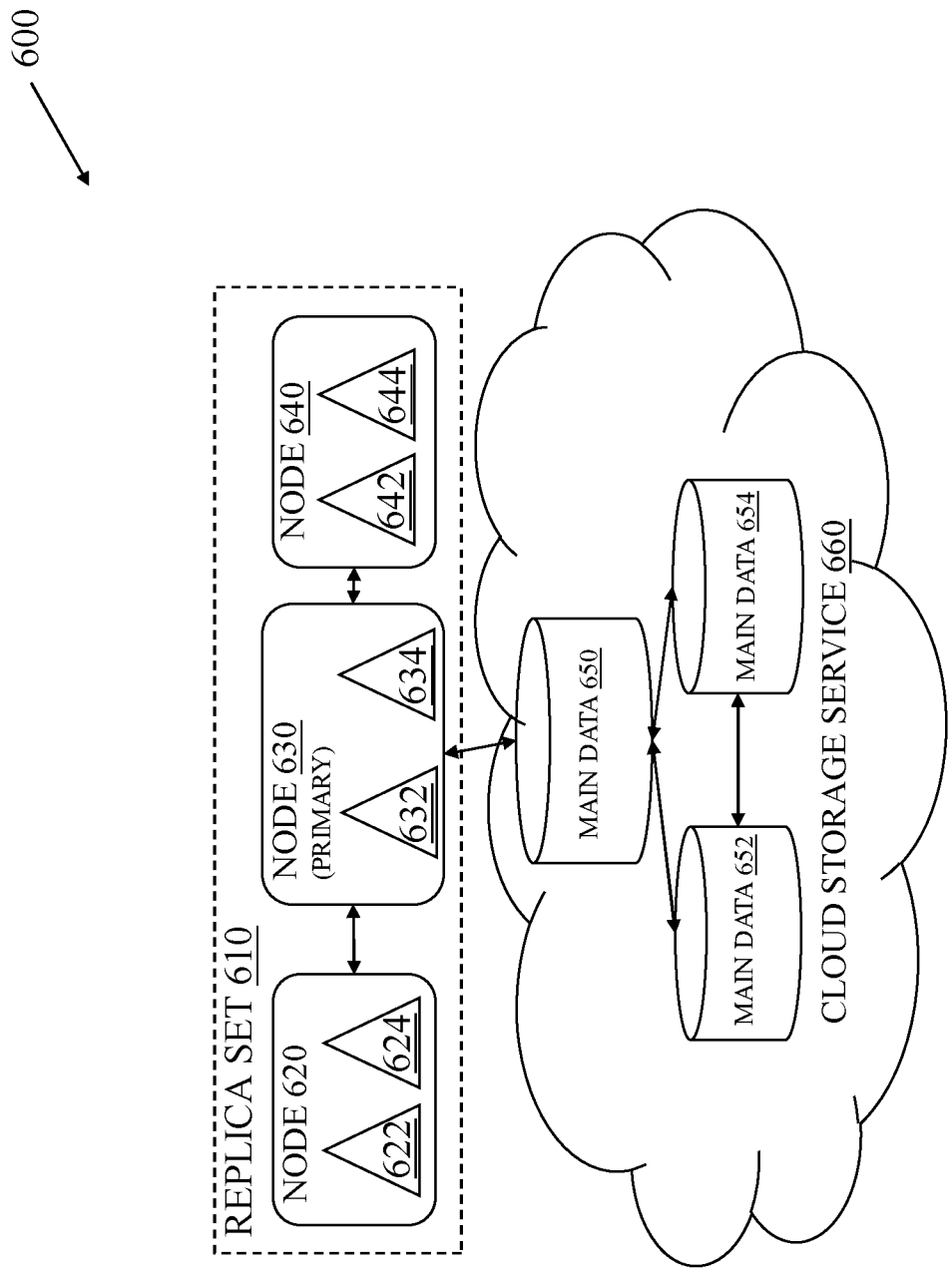
FIG. 6 illustrates system 600 that represents a main-delta cloud architecture with a single primary node, according to some embodiments.

FIG. 6 illustrates system 600 that represents a main-delta cloud architecture with a single primary node, according to some embodiments. Main-delta architecture 600 includes replica set 610 including replicas of cluster nodes. For example, node 620, node 630, and node 640. In some embodiments, replica set 610 may include more than three replicas. Each cluster node, such as node 620, node 630, and node 640, includes at least two deltas. Cluster node 620 includes delta 622 and delta 624, cluster node 630 includes delta 632 and delta 634, cluster node 640 includes delta 642 and delta 644.

In an embodiment, node 630 is designated as a primary or master node. This means that node 630 is responsible for handling the read and write operations. Further, node 630 has the latest state of the data all the time. Therefore, node 630 is assigned to merge the data from its deltas, delta 632 and delta 634, to the main data 650 all the time. Nodes 630 and 640 discard their deltas, when they are full. Once the deltas are merged, the data from the deltas is persisted, because it is merged to the main data 650, which is persisted on the cloud and all the guarantees of the cloud storage service 660 apply.

In an embodiment, if the primary node, e.g., node 630, fails, a new primary node is selected by the replicated application. This selection is performed by an algorithm that checks the timestamps of the last insert/write operation of nodes 620 and 640. Based on the timestamps, the algorithm decides which of the two nodes, 620 and 640, has the latest data after the primary node 630 failed. Then, this node is selected and becomes the new primary node. Once the new primary node is designated, this node becomes responsible for merging its deltas to the main data 650. Main data 650 is internally replicated to main data 652 and main data 654 and managed by the cloud storage service 660.

Figure 7:
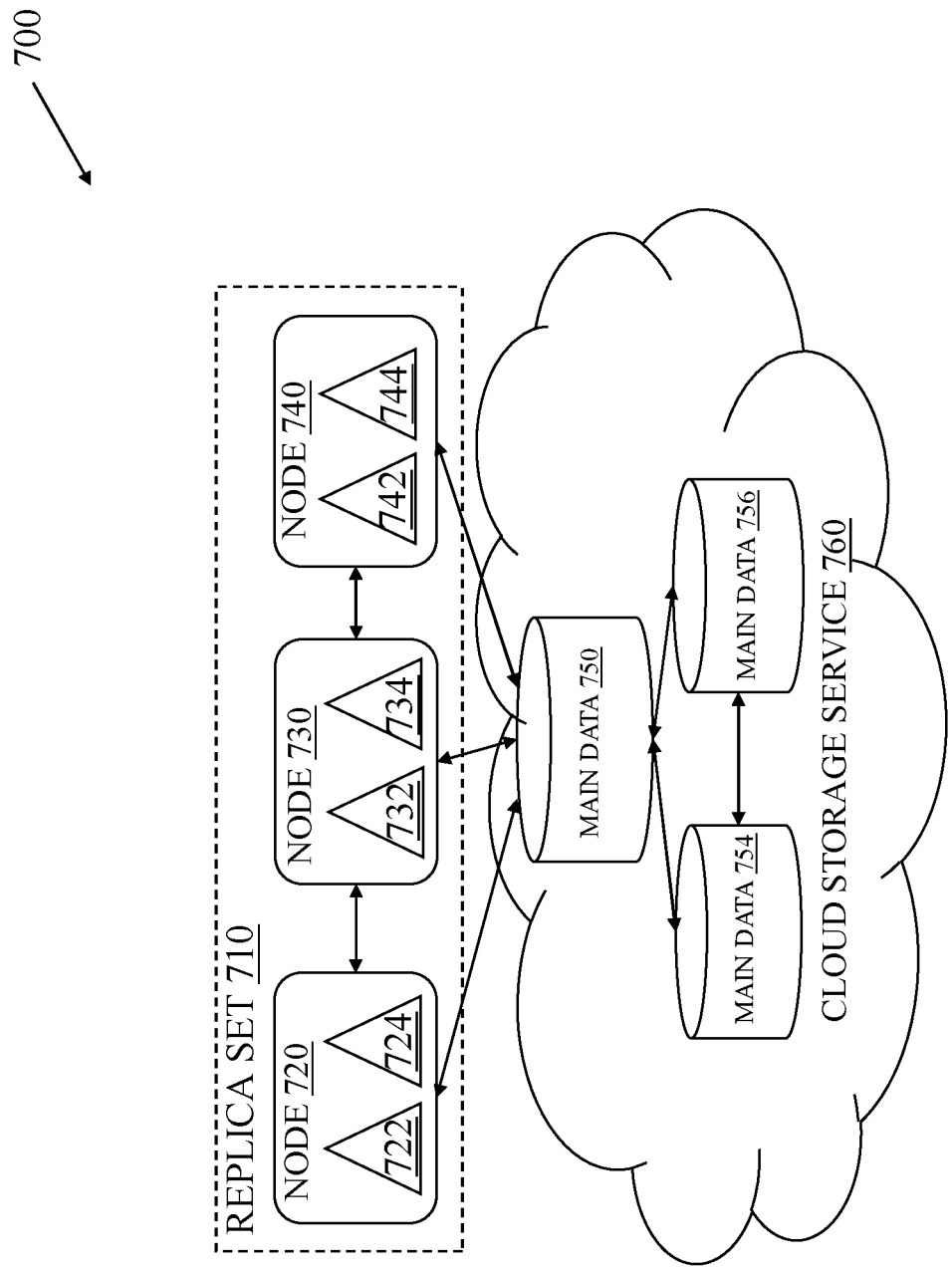
FIG. 7 illustrates system 700 that represents a main-delta cloud architecture with a quorum system, according to some embodiments.

FIG. 7 illustrates system 700 that represents a main-delta cloud architecture with a quorum system, according to some embodiments. Main-delta architecture 700 is a peer-to-peer system without defined primary or secondary nodes. It supports quorum reads and quorum writes, where "n" (i.e., quorum count) out of the "k" (number of replicas) nodes must respond to the read or write request.

Main-delta architecture 700 includes a replicated application with a replica set 710 including replicas of cluster nodes. For example, node 720, node 730, and node 740. In an embodiment, each cluster node, such as node 720, node 730, and node 740, includes at least two deltas. Cluster node 720 includes delta 722 and delta 724, cluster node 730 includes delta 732 and delta 734, cluster node 740 includes delta 742 and delta 744. As described in system 500C, any subset of the nodes 720, 730, and 740 of the replica set 710 are responsible to handle read and write operations. For example, a subset of two nodes, node 720 and node 740, is selected. For each operation a subset of the nodes is selected to perform the requested operation.

In some embodiments, for each operation, a different subset of two nodes from the three nodes can be selected. For example, for a first write operation, nodes 720 and 730 are selected to process the operation, and for a second write operation, nodes 730 and 740 are selected to perform the operation. Therefore, the cluster nodes (720, 730, and 740) can have a different set of write/insert operations in their deltas. Hence, the deltas in each node may have different data. For this reason, the deltas from all the three nodes have to be merged, in order to avoid losing data. The deltas are merged in main data 750. Main data 750 is internally replicated to main data 754 and main data 756. These data storages are located on the cloud and managed by the cloud storage service 760.

Figure 8:
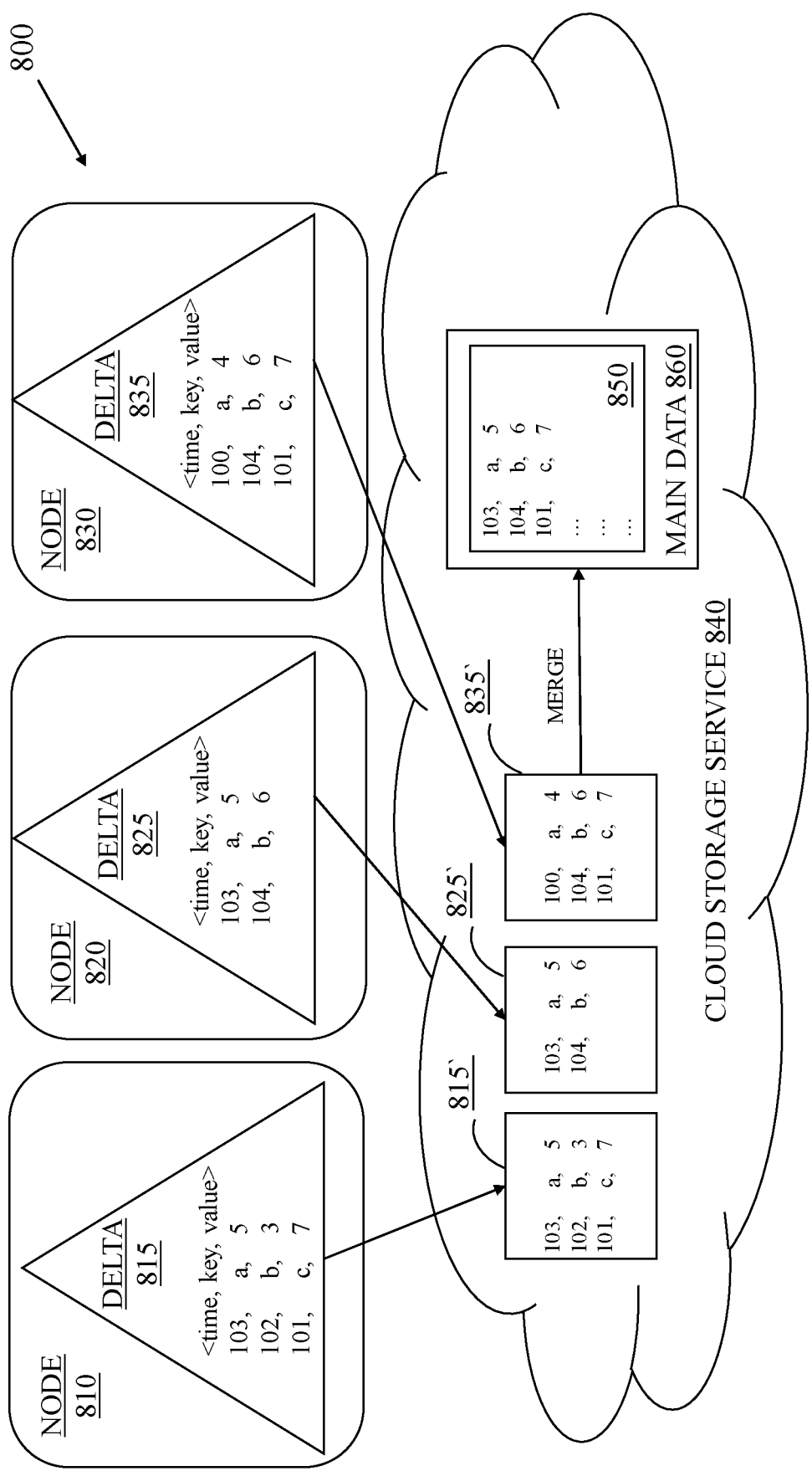
FIG. 8 illustrates system 800 that represents a delta merge process for a quorum system in a cloud architecture, according to some embodiments.

FIG. 8 illustrates system 800 that represents a delta merge process for a quorum system in a cloud architecture, according to some embodiments. System 800 includes node 810, node 820, and node 830 as part of a replica set (such as replica set 710). Each node, includes a delta storage unit that stores replicated data in a data memory table with the following properties: time, key, and value. The "time" property defines a timestamp, when the given data was inserted in the delta.

Each node, 810, 820, and 830, independently flushes its data from deltas 815, 825, and 835 to a cloud storage 840, whenever their delta is full. Cloud storage 840 receives three copies of the memory tables of the deltas: 815', 825', and 835'. In various embodiments, due to the quorum writes, it is uncertain that any single node in the replica-set has all the recent writes. Therefore, a delta merge process is performed to reconcile the deltas of all the nodes of the replica set. A background compaction task merges the multiple copies of flushed deltas, 815', 825', and 835', into a single combined delta storage 850. The combined delta storage 850 is stored as a sorted string table (SST) that includes the flushed data from the deltas' memory tables. Combined delta storage 850 is shared across the three nodes 810, 820, and 830.

Further, the combined delta storage 850 is appended to main data 860. More specifically, the SST of the combined delta storage 850 is added to the main data 860, which contains all the other SSTs. In various embodiments, the main data 860 is stored on the shared cloud storage 840 that allows for multiple writes (for example, an NFS storage or an Object storage).

When a read request is received, each node in the replica set searches their deltas and the single shared main. When the quorum is satisfied, the result is returned to the client.

Figure 9:
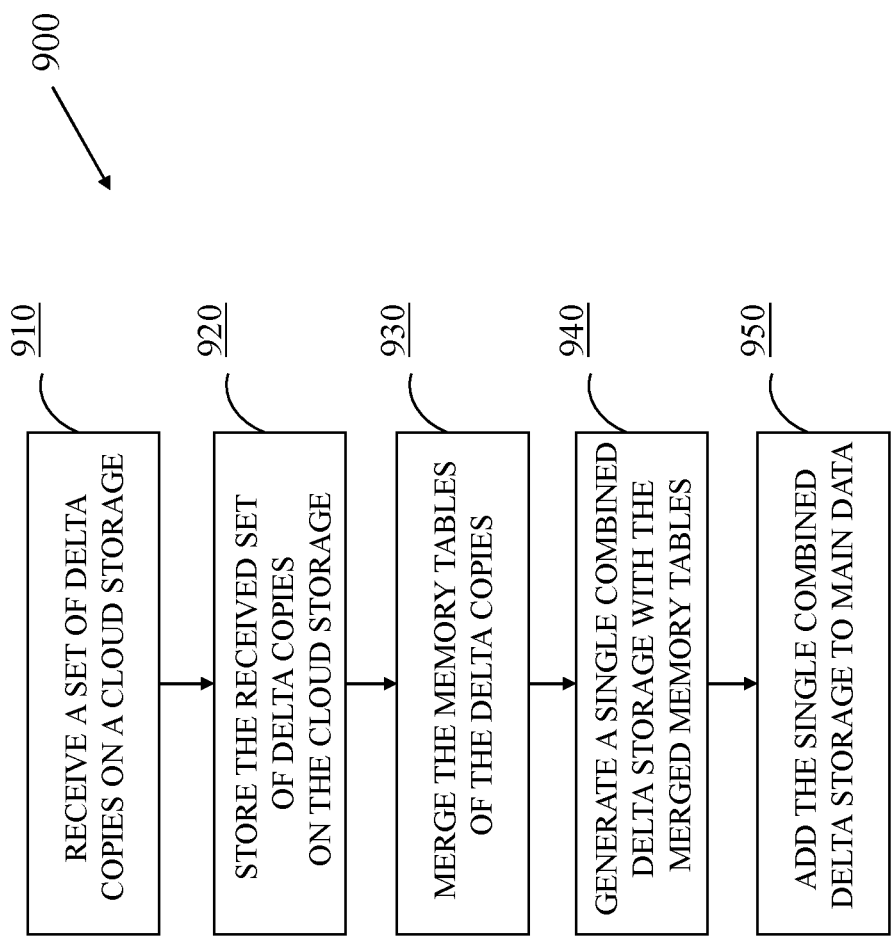
FIG. 9 is a flow diagram of process 900, according to some embodiments.

FIG. 9 is a flow diagram of process 900 according to some embodiments. Process 900 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 9, as will be understood by a person of ordinary skill in the art.

Process 900 describes a method for merging deltas from replica nodes to the main data on the cloud. The replica nodes are grouped in a replica set. A replica set includes two or more replica nodes of a cluster. Each replica node includes two or more delta storage units (i.e., deltas). The delta storage units are stored locally within an application, either in-memory or on-disk. The deltas are replicated at application-level. The deltas are small temporary data stores with fixed size. In some embodiments, the deltas are at least two—when, a delta is being flushed, there is at least one other delta available for write operations.

At step 910, a set of delta copies from a replica set is received on a cloud storage. The delta copies are copies of the data stored in the delta storage units of the replica nodes from the replica set. The delta copies represent data memory tables with the following properties: time, key, and value. In various embodiments, the delta copies are received on the cloud storage from each replica node independently, when the delta storage units are full. For example, when the deltas are full, the data from the deltas is flushed to the cloud storage. Then, the data in the deltas is deleted and the deltas are re-used to store new data. This process repeats.

At step 920, the set of delta copies with the data memory tables are stored on the cloud storage. In various embodiments, the cloud storage is a shared storage that can be accessed from the replica nodes with multiple read and write operations. At step 930, the memory tables of the delta copies are merged together. At step 940, a single combined delta storage is generated with the merged memory tables of the delta copies. In this way, the data from the deltas of all cluster nodes in the replica set is merged into one single data unit and thus, avoiding redundant replicas of the same data.

At step 950, the generated single delta storage is added to a main data storage on the cloud storage. The main data storage is stored on a persistent cloud storage. In various embodiments, the main storage is internally replicated on the cloud.

Figure 10:
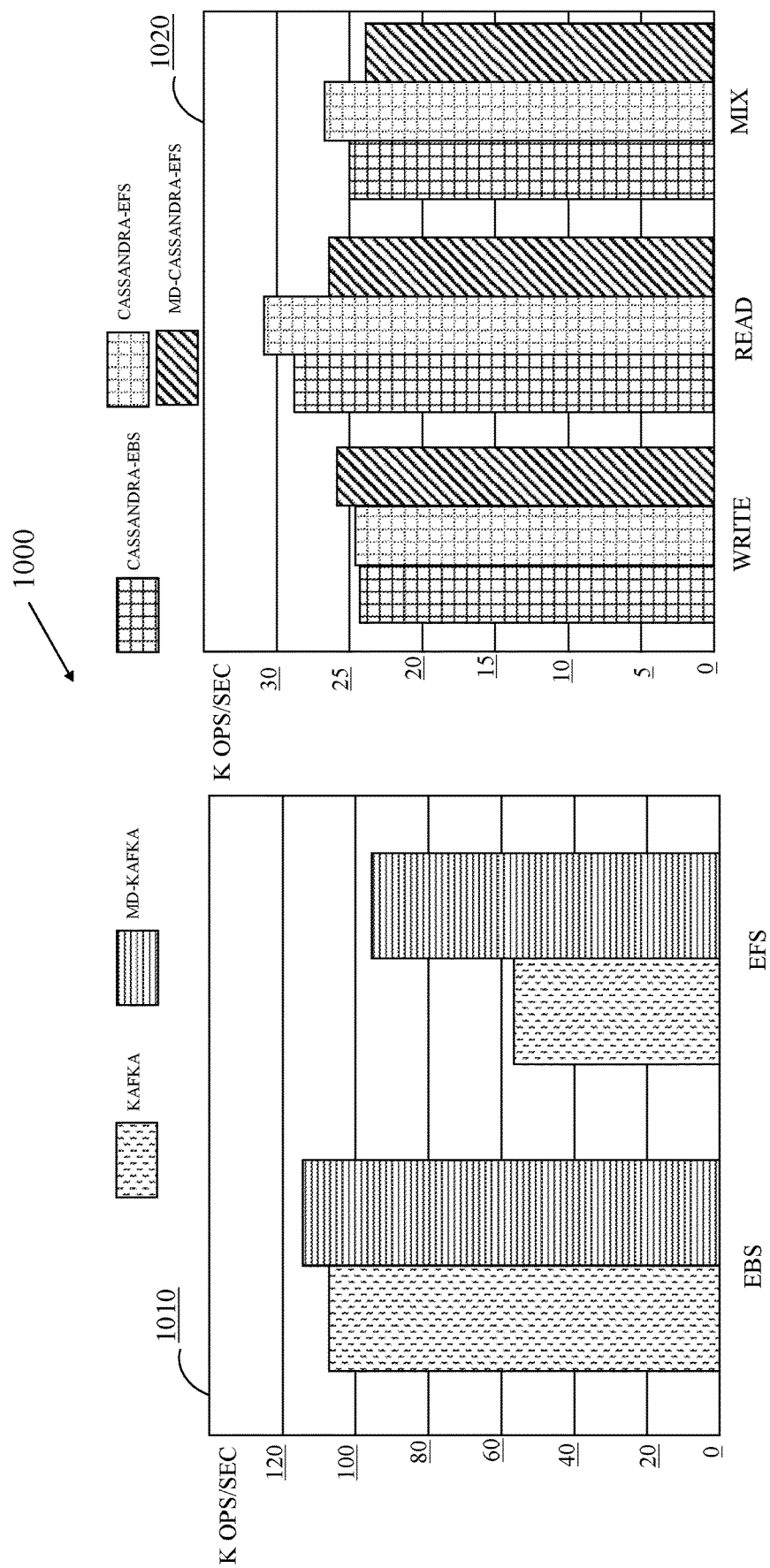
FIG. 10 is a diagram of system 1000 that represents performance characteristics, according to some embodiments.

FIG. 10 is a diagram of system 1000 that represents performance characteristics, according to some embodiments. System 1000 represents experimental evaluation of process 900 implemented for Apache Kafka® and Apache Cassandra®.

Kafka® and Cassandra® clusters have application-level replication of 3 and read/write quorum for Cassandra® is 2. Two types of storage are used: Amazon Elastic Block Store (EBS), and Amazon Elastic File System (EFS). In FIG. 10, item 1010, implementations with no modifications are labelled as "kafka" and "cassandra", and implementations based on main-delta are labelled as "md-kafka", and "md-cassandra". Item 1010 shows the comparison of the throughput (thousand write operations per second) of two Kafka® versions. The throughput of "md-kafka" is similar to the original Kafka in the case of EBS storage. In the case of EFS storage, much higher throughput is achieved using process 900 (close to 2×), because the delta architecture inherently batches the write operations to the storage. In addition, the storage cost and space savings are three times higher with both EBS and EFS storage.

In item 1020 of FIG. 10, the throughput comparison for Cassandra is presented. The modified Cassandra ("md-cassandra") requires storage type that allows for multiwriter/multi-reader systems. Therefore, EFS storage is used for "md-cassandra", labelled as "md-cassandra-efs". However, original Cassandra can still use EBS storage, where each Cassandra node has a dedicated EBS volume.

The throughput of "md-cassandra-efs" is comparable to original Cassandra using EBS storage ("cassandra-ebs") and original Cassandra using EFS storage ("cassandra-efs"), across three types of workloads: read-only, write-only, and mixed workload. The read throughput, however, is slightly worse likely due to contention on the single main file. Storage cost and space savings were slightly less than 3× (2.8×, averaged over 10 runs), because until the compaction job merges the deltas there exist 3 application-level replicas of them on the cloud storage. Tuning the compaction job to run frequently can bring the savings closer to 3×, but with a higher load on the server.

Figure 11:
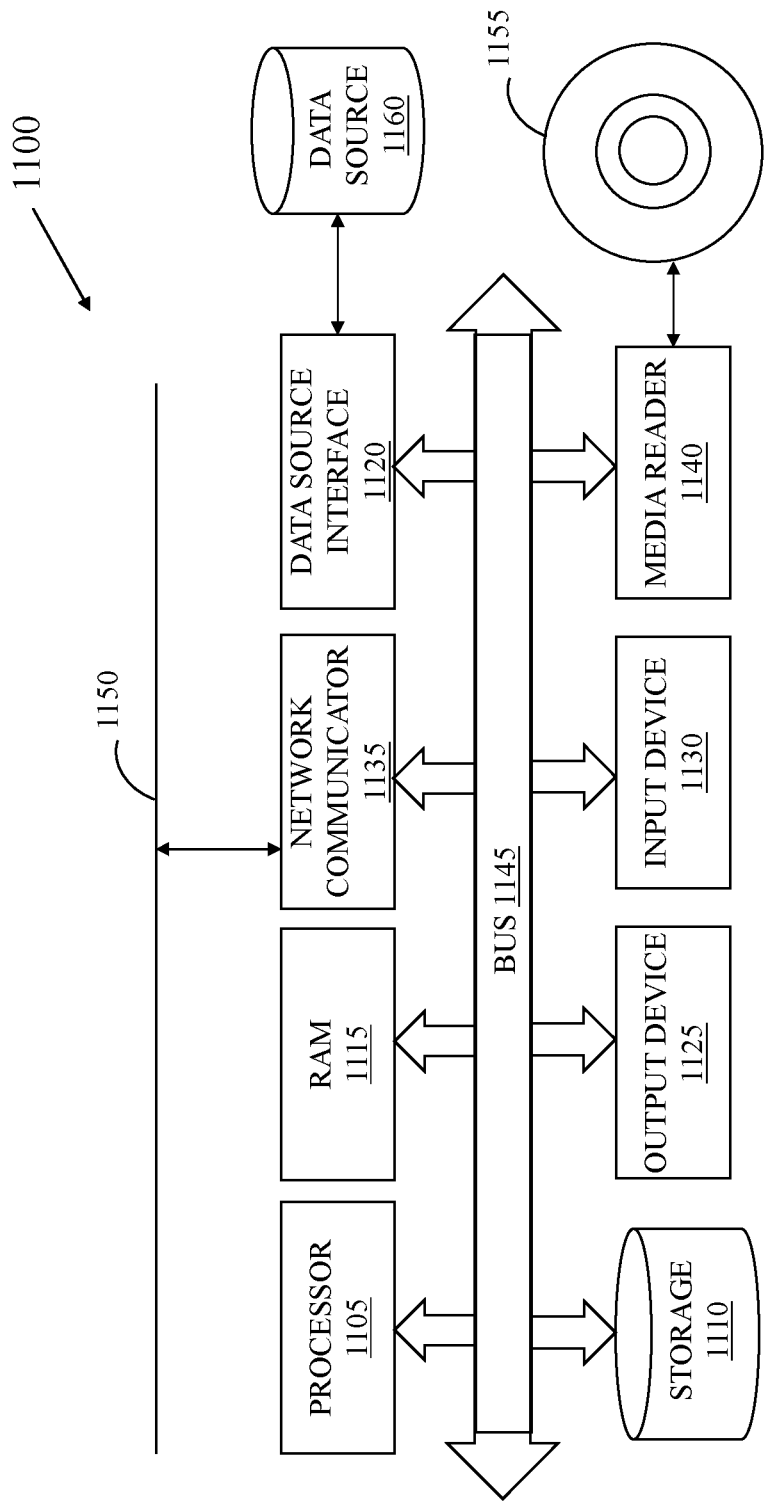
FIG. 11 is a block diagram of system 1100 according to some embodiments.

FIG. 11 is a block diagram of system 1100 according to some embodiments. Various embodiments may be implemented, for example, using one or more well-known computer systems, such as computer system 1100 shown in FIG. 11. One or more computer systems 1100 may be used, for example, to implement any of the embodiments discussed herein, as well as combinations and sub-combinations thereof. Computer system 1100 can be used, for example, to implement method 900 of FIG. 9.

The computer system 1100 includes a processor 1105 that executes software instructions or code stored on a computer readable storage medium 1155 to perform the above-illustrated methods. The processor 1105 can include a plurality of cores. The computer system 1100 includes a media reader 1140 to read the instructions from the computer readable storage medium 1155 and store the instructions in storage 1110 or in random access memory (RAM) 1115. The storage 1110 provides a large space for keeping static data where at least some instructions could be stored for later execution.

According to some embodiments, such as some in-memory computing system embodiments, the RAM 1115 can have sufficient storage capacity to store much of the data required for processing in the RAM 1115 instead of in the storage 1110. In some embodiments, all of the data required for processing may be stored in the RAM 11015. The stored instructions may be further compiled to generate other representations of the instructions and dynamically stored in the RAM 1115. The processor 1105 reads instructions from the RAM 1115 and performs actions as instructed.

According to one embodiment, the computer system 1100 further includes an output device 1125 (e.g., a display) to provide at least some of the results of the execution as output including, but not limited to, visual information to users and an input device 1130 to provide a user or another device with means for entering data and/or otherwise interact with the computer system 1100. Each of these output devices 1125 and input devices 1130 could be joined by one or more additional peripherals to further expand the capabilities of the computer system 1100.

A network communicator 1135 may be provided to connect the computer system 1100 to a network 1150 and in turn to other devices connected to the network 1150 including other clients, servers, data stores, and interfaces, for instance. The modules of the computer system 1100 are interconnected via a bus 1145. Computer system 1100 includes a data source interface 1120 to access data source 1160. The data source 1160 can be accessed via one or more abstraction layers implemented in hardware or software. For example, the data source 1160 may be accessed by network 1150. In some embodiments, the data source 1160 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A system comprising:
a memory storing processor-executable process steps;
a processing unit to execute the processor-executable process steps to cause the system to:
receive, by a cloud storage service on a cloud storage, a set of delta copies from a set of cluster nodes of a replica set, each replica cluster node maintaining respective delta storage units using application-level replication and the delta copies being copies of the delta storage units located on the set of cluster nodes;

store the set of delta copies with corresponding memory tables on the cloud storage;

merge the memory tables of the stored set of delta copies;

generate a single combined delta storage including the merged memory tables of the stored set of delta copies; and add the generated single combined delta storage to a main data storage of the cloud storage service on the cloud, the combined delta storage of the main data storage being shared across the set of cluster nodes.

2. The system of claim 1, wherein a cluster node from the set of cluster nodes includes at least two delta storage units.

3. The system of claim 1, wherein a first delta copy from a first delta storage unit is received from a first cluster node independently from a second delta copy received from a second delta storage unit of a second cluster node, when the first delta storage unit is full.

4. The system of claim 1, wherein the main data storage is internally replicated on the cloud and managed by a cloud storage service.

5. The system of claim 4, further causes the system to: upon adding the generated single combined delta storage to the main data storage, provide fault-tolerance and high availability to the set of delta copies by the cloud storage service.

6. The system of claim 1, wherein the main data storage is stored on a shared cloud storage that provides multiple read and write operations to the main data storage.

7. A computer-implemented method comprising:

receiving, by a cloud storage service on a cloud storage, a set of delta copies from a set of cluster nodes of a replica set, each replica cluster node maintaining respective delta storage units using application-level replication and the delta copies being copies of the delta storage units located on a set of cluster nodes as part of a replica set the set of cluster nodes;

storing the set of delta copies with corresponding memory tables on the cloud storage;

merging the memory tables of the stored set of delta copies;

generating a single combined delta storage including the merged memory tables of the stored set of delta copies; and adding the generated single combined delta storage to a main data storage of the cloud storage service on the cloud, the combined delta storage of the main data storage being shared across the set of cluster nodes.

8. The method of claim 7, wherein a cluster node from the set of cluster nodes includes at least two delta storage units.

9. The method of claim 7, wherein a first delta copy from a first delta storage unit is received from a first cluster node independently from a second delta copy received from a second delta storage unit of a second cluster node, when the first delta storage unit is full.

10. The method of claim 7, wherein the main data storage is internally replicated on the cloud and managed by a cloud storage service.

11. The method of claim 10, further comprising: upon adding the generated single combined delta storage to the main data storage, providing fault-tolerance and high availability to the set of delta copies by the cloud storage service.

12. The method of claim 7, wherein the main data storage is stored on a shared cloud storage that provides multiple read and write operations to the main data storage.

13. A non-transitory computer-readable device having instructions stored thereon that, when executed by at least one computing device, cause the at least one computing device to perform operations comprising:

receiving, by a cloud storage service on a cloud storage, a set of delta copies from a set of cluster nodes of a replica set, each replica cluster node maintaining respective delta storage units using application-level replication and the delta copies being copies of the delta storage units located on the set of cluster nodes;

storing the set of delta copies with corresponding memory tables on the cloud storage;

merging the memory tables of the stored set of delta copies;

generating a single combined delta storage including the merged memory tables of the stored set of delta copies; and adding the generated single combined delta storage to a main data storage of the cloud storage service on the cloud, the combined delta storage of the main data storage being shared across the set of cluster nodes.

14. The non-transitory computer-readable device of claim 13, wherein a cluster node from the set of cluster nodes includes at least two delta storage units.

15. The non-transitory computer-readable device of claim 13, wherein a first delta copy from a first delta storage unit is received from a first cluster node independently from a second delta copy received from a second delta storage unit of a second cluster node, when the first delta storage unit is full.

16. The non-transitory computer-readable device of claim 13, wherein the main data storage is internally replicated on the cloud and managed by a cloud storage service.

17. The non-transitory computer-readable device of claim 16, further comprising: upon adding the generated single combined delta storage to the main data storage, providing fault-tolerance and high availability to the set of delta copies by the cloud storage service.

* * * * *